Sept. 24, 1968
H. OETIKER
3,402,436
CLAMP CONSTRUCTION
Filed Oct. 23, 1965
3 Sheets-Sheet 1
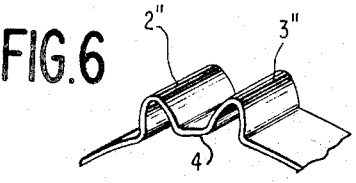
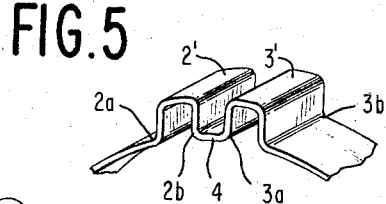
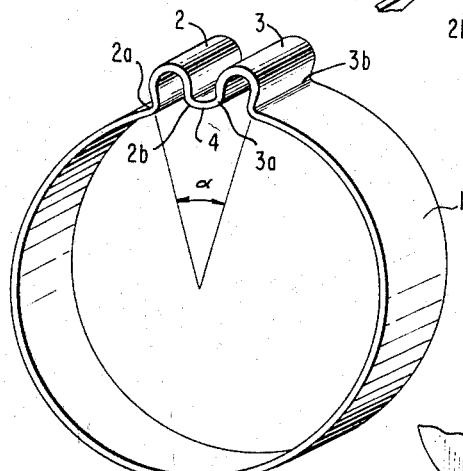
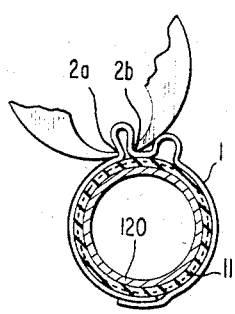
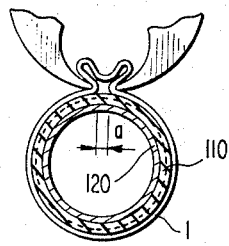
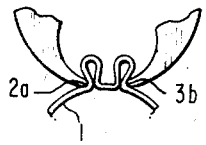
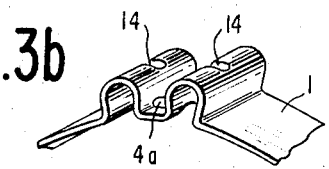
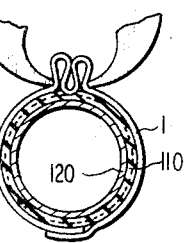
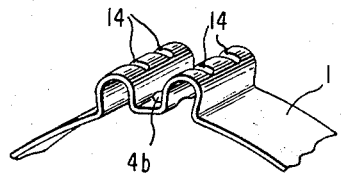
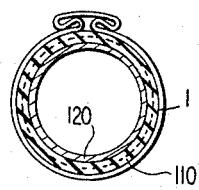
INVENTOR
HANS OETIKER
BY *Dicke & Craig*
ATTORNEYS Sept. 24, 1968   H. OETIKER   3,402,436
CLAMP CONSTRUCTION Filed Oct. 23, 1965   3 Sheets-Sheet 2

INVENTOR
HANS OETIKER

BY  *Dicke & Craig*

ATTORNEYS

Sept. 24, 1968
H. OETIKER
3,402,436
CLAMP CONSTRUCTION
Filed Oct. 23, 1965
3 Sheets-Sheet 3
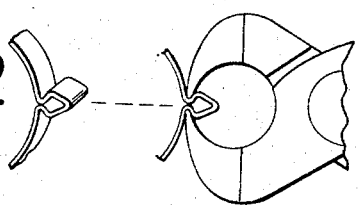
FIG.12
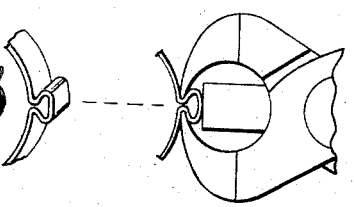
FIG.13
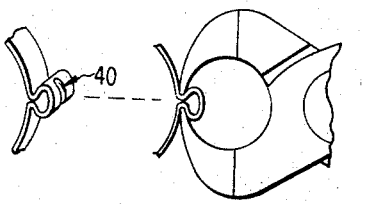
FIG.14
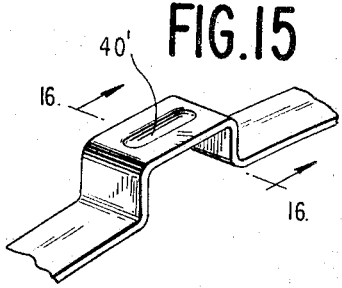
FIG.15
FIG.16
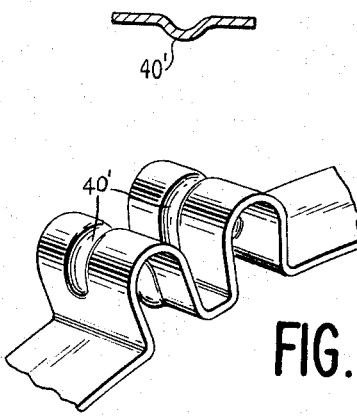
FIG.17
FIG.18
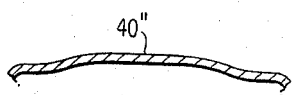
FIG.19
FIG.20
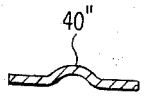
FIG.21
FIG.22
INVENTOR
HANS OETIKER
BY *Dicke & Craig*
ATTORNEYS

United States Patent Office 3,402,436
Patented Sept. 24, 1968

3,402,436
CLAMP CONSTRUCTION
Hans Oetiker, 21 Oberdorfstrasse, Postfach 93,
Horgen, Zurich, Switzerland
Filed Oct. 23, 1965, Ser. No. 502,929
Claims priority, application Switzerland, Nov. 24, 1964,
15,166/64; June 3, 1965, 8,067/65
27 Claims. (Cl. 24—20)

ABSTRACT OF THE DISCLOSURE

A clamp structure for fastening, for example, hoses to nipples, in which the contraction of the ring or band is realized by a unitary multihump fold structure of approximately undulatory shape and including at least two-bent out fold portions which can be contracted to form either a crown ear or double ear.

To prevent collapsing of an ear or fold, whether with a multi-hump structure or a single-fold or ear structure, reinforcing means are provided in the form of at least one indentation extending in the circumferential direction of the clamp and located in that portion of the fold or ear which faces radially outwardly of the clamp structure.

---

The present invention relates to an improved hose clamp and to a novel clamping structure for contracting the ring or band used in such hose clamps.

Clamping elements for the contracting of a ring are used with hose clamps to secure a hose on a nipple. Known in the prior art are endless rings which are provided with one or several ears or folds. These ears or folds are constituted by approximately rectangular bent-out portions of the band. A ring having such an ear or fold is slipped over the hose which, in turn, is to be slipped or installed on a nipple, with the ring of such diametric dimension that it barely passes over the hose. The ear or fold is then plastically compressed, remaining tangential to the ring, by means of pincers which are applied to the ring in the corners of the transition from the ring shape into the ear or lug shape. As a result thereof, the ring is pressed against the hose by shortening the circumference thereof. This operation is extremely simple, compared with the screw-type hose clamps also used in the prior art. Rings with only a single ear or fold are of limited utilization by reason of diameter considerations. As a general rule, only limited clamping ranges can be achieved therewith. With larger diameters, several ears or folds have to be used which are distributed over the circumference as evenly as possible.

In recent times, there now exists the necessity to utilize clamps provided with only one clamping place or compressing place, if possible. This is the case, for example, in the aviation industry and in the automotive industry in which hose connections have to be installed at places that are accessible only with difficulties. For the most part, the situation is then such that it is not possible to reach the clamp with pincers at more than one compressing place. A further reason exists which makes it additionally necessary that the compressing path has to be increased. It has become increasingly necessary to provide the nipple with a bulge or bead, for example, an annular spool-type enlargement over which has to be slipped the hose with a clamp previously slipped over and assembled thereon in order to prevent the pressed-on hose from sliding off the nipple at high operating pressures. The ring therefore has to be capable of being compressed in diameter by an amount twice the height of the bulge or bead forming the enlargement. The shortening of the ring in the circumferential direction has to be, therefore, increased. This is also the case if with larger hose diameters, several evenly distributed compressing places in the form of several folds or ears are utilized in which case the accessibility would have to be also possible from the backside thereof.

The present invention thus makes it possible to fulfill the aforementioned requirements also as regards good accessibility and increased compressibility.

According to one feature, the present invention essentially consists in that the ring or the band is provided at least at one place with a two-hump or multi-hump pocket-like bent-out portion of undulated shape forming the ear or fold structure.

With clamping devices as discussed, for example, in my U.S. Patents 2,614,304 and 3,082,498, good results have been obtained ordinarily as long as the band material had a certain thickness. In that case, the contraction of the ear or fold normally produced the approximately omega shape to achieve the desirable operation results as regards pressure withstandability.

On the other hand, with relatively thinner material, for instance, of less than 1 mm. in thickness, special tools had to be used heretofore to assure the correct shaping and formation of the fold or lug when the same is contracted. However, special tools are not only expensive but additionally may, at times, entail limitations as to the ease of installation.

To obviate these shortcomings, the ears or folds are reinforced according to a further feature of the present invention by pressed-out portions in the form of indentations, recesses, notches, grooves, or the like so as to assure the formation of the correct shape of the fold during contraction thereof even when using relatively thinner band materials.

Accordingly, it is an object of the present invention to provide a hose clamp of the type described above which obviates the shortcomings and drawbacks encountered with the prior art constructions.

Another object of the present invention resides in a hose clamp which is so constructed as to eliminate the need for special tools to assure correct formation of the fold.

A further object of the present invention resides in the provision of a hose clamp having a reinforced fold or ear of such construction as to permit use of band material of less than 1 mm. in thickness without requiring special precautions during installation thereof.

It is another object of the present invention to provide a hose clamp which makes it possible to considerably reduce the circumference of the clamp notwithstanding limited accessibility during installation of the clamp.

A further object of the present invention resides in the provision of a hose clamp of the type described above which permits the use of specially constructed nipples having enlargements in the form of beads or bulges to thereby assure higher pressure withstandability of the hose clamp.

Still another object of the present invention resides in the provision of a hose clamp with a specially constructed ear or fold that greatly increases its strength by extremely simple means.

These and further objects, features, and advantages of the present invention will become more obvious from the following description when taken in connection with the accompanying drawing, which shows, for purposes of illustration only, several embodiments in accordance with the present invention, and wherein:

FIGURE 1 is a perspective view of a ring forming a hose clamp provided with a contracting means in the form of a two-hump bent-out portion in accordance with the present invention;

FIGURE 2 is a transverse cross-sectional view, on a reduced scale, through a hose clamp of FIGURE 1, installed on a hose and nipple, and illustrating the creation of a crown-like ear;

FIGURE 2a is a transverse cross-sectional view similar to FIGURE 2 and illustrating the condition of the crown-like ear of FIGURE 2 after a further operation in accordance with the present invention;

FIGURE 3a is a cross-sectional view, similar to FIGURE 2, and illustrating the first operating step in the creation of a double-ear with a hose clamp in accordance with the present invention as illustrated in FIGURE 1;

FIGURE 3b is a partial cross-sectional view, similar to FIGURE 3a, and illustrating the further progress of the double-ear for the hose clamp of FIGURE 3a;

FIGURE 3c is a transverse cross-sectional view similar to FIGURE 3a, and illustrating the completed double-ear obtained with a hose clamp of FIGURE 1;

FIGURE 4a is a partial perspective view of a modified embodiment of a hose clamp in accordance with the present invention provided with novel reinforcing means of the ear or fold structure;

FIGURE 4b is a partial perspective view, similar to FIGURE 4a, and illustrating a modified construction of a reinforcing means of the hose clamp of FIGURE 1;

FIGURE 5 is a partial perspective view, similar to FIGURES 4a and 4b, and illustrating a rectangular construction of a two-hump construction of the fold or ear;

FIGURE 6 is a partial perspective view, similar to FIGURE 5, and illustrating a still further modified embodiment of a more or less pointed two-hump construction of the fold or ear;

FIGURE 12 is a partial perspective view on a hose clamp of the prior art which, when closing the lug or ear with ordinary pincers, fails to produce the desired shape thereof during contraction by means of such pincers;

FIGURE 13 is a partial perspective view similar to FIGURE 12, and illustrating a special tool used heretofore to assure the proper shaping of the fold or lug when contracting the same by means of the pincers;

FIGURE 14 is a partial perspective view similar to FIGURES 12 and 13, and illustrating a clamp in accordance with the present invention provided with a reinforcement obviating the shortcomings encountered with the contructions of FIGURES 12 and 13;

FIGURE 15 is a partial perspective view of one embodiment of a clamp structure provided with an approximaely rectangular fold having reinforcing means according to the present invention;

Figure 7B:
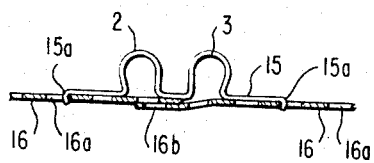
FIGURE 7b is a partial cross-sectional view through the special clamp of FIGURE 7a with all the parts in a single plane.

FIGURE 16 a cross-sectional view, taken along line 16—16 of FIGURE 15;

FIGURE 17 is a partial perspective view of a modified embodiment of a clamp structure having a double-ear of the type illustrated in FIGURE 1 and provided with reinforcing means according to the present invention;

FIGURE 18 is a partial perspective view, similar to FIGURE 15 and illustrating an aproximately rectangular fold or ear provided with a modified reinforcing means according to the present invention;

FIGURE 19 is a cross-sectional view taken along line 19—19 of FIGURE 18;

FIGURE 20 is a cross-sectional view taken along line 20—20 of FIGURE 18;

FIGURE 21 is a cross-sectional view taken along line 21—21 of FIGURE 18; and

FIGURE 22 is a cross-sectional view, similar to FIGURE 19, of a still further modified construction of an outwardly formed reinforcing means in accordance with the present invention.

Referring now to the drawing wherein like reference numerals are use throughout the various views to designate like parts, and more particularly to FIGURE 1, this figure illustrates an endless ring 1, appropriately consisting of steel which offers good deforming characteristics. At a place within the angle α, the ring 1 is provided with a pocket-like bent-out portion or fold structure consisting of the two humps 2 and 3. The humps are of approximately semi-circular shape. The transition of the humps 2 and 3 at the places 2a and 3b into the circular form of the ring takes place with relatively small radii of curvature so that rounded-off corners result thereat. The tool, for example, pincers, are applied at these corners during the contracting of the ring 1. The center part 4 is present between the two humps 2 and 3 which center part 4 lies approximately within the plane of the ring circle. Also, the transitions at the places 2b and 3a from the humps 2 and 3 into the center part 4 take place by means of relatively small radii of curvature in order that the possibility exists to apply the pincers also at an individual hump and to contract the same by itself.

The following favorable dimensions and results were found which are mentioned herein only for illustrative purposes as one example of the present invention:

With an endless ring of, for example 30 mm. in diameter and 0.8 mm. of band thickness, the distance from point 2a to point 3b in the uncontracted condition amounts to about 13.5 mm. with a hump width of about 5 mm. In the contracted condition, this distance from corner 2a to corner 3b may be reduced to 4 mm. and less. The distance a in FIGURE 2 becomes then 2.5 mm. and less, thus the ring circumference is shortened by about 9.5 mm. and the diameter of the ring at the average by about 3 mm.

The contracting of the bent-out portions or fold structures can take place in different ways. According to a first method, both humps 2 and 3 may be contracted simultaneously by the application of the pincers in the corners 2a and 3b (FIG. 2) to secure the hose 110 on the nipple 120. The ring 1 is thereby deformed into a shape which will be referred to hereinafter as the crown shape. The previous corners 2a and 3b can then be approached to one another by a distance less than the width of a hump.

According to a second method, at first one hump is contracted by means of the pincers and thereupon both humps are contracted simultaneously as illustrated in FIGURES 3a, 3b, and 3c. The pincers are applied at first in corners 2a and 2b (FIGURE 3a) and the hump 2 is contracted. Thereupon, the pincers are applied at corners 2a and 3b (FIGURE 3b) and two humps 2 and 3 are contracted. The double-ear shape according to FIGURE 3c results from this method. The contract-ability is thereby somewhat smaller in this case than with the crown-shaped ear of FIGURE 2. However, in this case the originally, approximately straight center part 4 provided at the ear or lug remains in contact with the hose surface, essentially along the arc of the ring. This has the advantage that the hose surface cannot be pressed out, and therewith the danger of a leakage place is avoided.

A particularly favorable form of the humps is the circular form of FIGURE 1 whereby a relatively sharp bend with small radii of curvature, at least three times smaller than the hump radius is present in the corners 2a, 2b, 3a, and 3b. The center part 4 is as straight as possible; it may be appropriate in connection therewith to additionally reinforce the center part 4 which can be achieved by means of pressed-in or pressed-out portions or ribs in this part designated by reference numerals 4a and 4b. These pressed-in or pressed-out reinforcing portions may extend in the circumferential direction in the form of grooves 4a and 4b as shown in FIGURES 4a and 4b. However, also a circularly shaped pressed-out configuration may be used instead. Pressed-in or pressed-out reinforcing portions or ribs 14 may also be provided on the humps 2 and 3 for reinforcing purposes as will be described more fully hereinafter. The hump shape may also be of approximately rectangular form with rounded-off corners to produce folds 2′ and 3′ (FIGURE 5). A somewhat more pointed form of humps 2″ and 3″ approximately of parabolic or sinusoidal shape is also appropriate (FIG. 6).

Figure 7A:
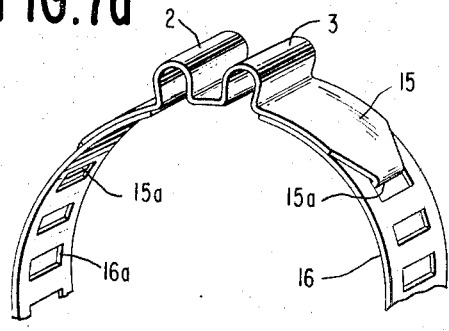
FIGURE 7a is a partial perspective view of a special clamping element in accordance with the present invention for use with a ladder-type band.

For clamping on hoses with larger diameter, oftentimes which do not warrant the manufacture of special rings, individual clamping members may be used in conjunction with a known ladder-type band 16 as illustrated in FIGURES 7a and 7b. These individual clamping members 15 are used with the band 16 in such a manner that a band piece of shorter length is provided with claws 15a at the ends thereof and with humps 2 and 3 in the center thereof. The claws 15a can be inserted into the perforation apertures 16a provided in the band 16 (FIGURES 7a and 7b). Appropriately, both ends 16b of the band 16 are cut so as to extend and overlap below the humps 2 and 3. A bulging out of the hose material is also avoided thereby. Appropriately, the crown shape is used in connection therewith.

Figure 8A:
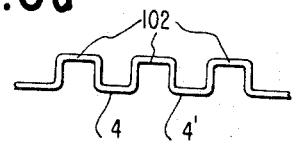
FIGURE 8a is a partial elevational view of a clamp structure in accordance with the present invention, illustrating a three-hump bent-out portion or fold construction of undulated shape.
Figure 8B:
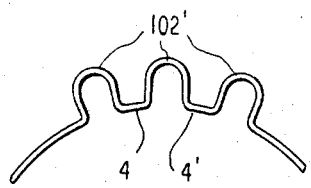
FIGURE 8b is a partial elevational view similar to FIGURE 8a and illustrating a modified embodiment of a three-hump bent-out portion or fold construction in accordance with the present invention.

Also, the application of hose clamps provided with more than two humps at the bent-out place is within the scope and spirit of the present invention. For example, clamps with three humps 102 and 102′ according to FIGURES 8a and 8b may be used. The contracting then takes place best corresponding to the double-ear shape of FIGURES 3a, b, and c. Special pincers are appropriately used which additionally assure that the center parts 4 and 4′ are not bent out. However, one may also proceed with the installation thereof in such a manner that at first the two outer ears and thereupon all three ears are contracted together.

The crown ear of FIGURE 2 can be pressed flat by radially compressing the same in the axis of symmetry. A clamp with only a very slight projection results therefrom as shown in FIGURE 2a.

As a further application of the present invention may be mentioned the clamping of bundles of hoses, pipes, electric cables and the like. Endless rings or a clamping element in combination with a perforated band as illustrated in FIGURES 7a and 7b may be used in connection therewith.

Additionally, with bands to be closed, for example, of great length thereof, the multi-hump bent-out portions or fold structure may also be arranged at several places in order to attain a particularly large contraction.

Figure 10:
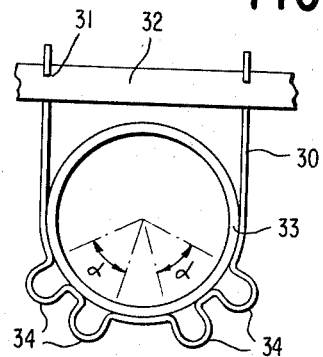
FIGURE 10 is an elevational view illustrating the use of the clamp of FIGURE 9 for supporting a pipe or cable.

The clamping element can also be used for other purposes where a large contractability is required. For example, cables and pipe supports (FIG. 10) may be provided with multi-hump bent-out portions or fold structures. A band 30 with transverse slots 31 is suspended on a bearer rail 32 and carries the pipe or cable 33. Two-humped folds or pocket-like bent-out portions of undulated shape are thereby accommodated at the places within the angle α. By contracting the clamping elements 34, the pipe is pulled against the rail 32.

Figure 11:
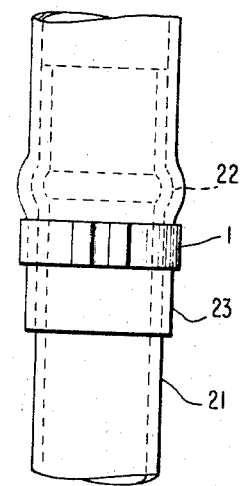
FIGURE 11 is an elevational view illustrating the use of a clamp in accordance with the present invention for securing a hose to a nipple provided with a bulged portion.
Figure 9:
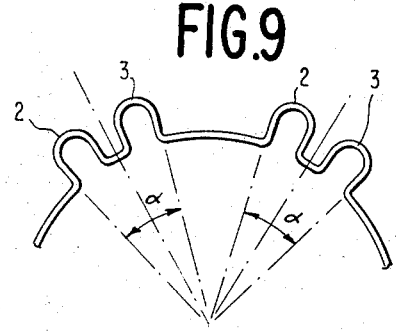
FIGURE 9 is a partial elevational view illustrating a double, two-hump bent-out portion or fold construction of a clamp in accordance with the present invention.

FIGURE 11 shows the application of the ring 1 having a clamping element, for example, according to FIGURE 1, to a nipple 21 having a bulge 22. The ring is thereby brought from the hose side over the bulge to the clamping place as illustrated. Owing to the greater contractability the ring 1 can be readily slipped over the bulge 22 while assembled on the hose 23 without jeopardizing the pressure withstandability of the hose clamp assembly.

Normally few difficulties are encountered when contracting an ear or fold of the type described in my aforementioned patents by means of conventional pincers as long as the band material has a thickness of 1.2 to 2.5 mm. The folds or ears can be contracted into an approximately annular or omega shape under those circumstances with the use of conventional pincers. With band material of a thickness less than 1 mm., however, there exists the danger that a buckling or collapse takes place in the center of the fold, i.e., at the tip thereof as illustrated in FIGURE 12. The parts adjacent the sharp bend, i.e., the parts adjacent the tip or apex then no longer participate in the deformation, thus reducing the deformability from an over-all point of view. In order to counteract the collapse or buckling of an ear or fold in the center thereof, special tools were used such as shown in FIGURE 13 which are provided with a suitable abutment in the center to prevent the formation of the sharp bend and preclude the undesirable increase in height of the contracted fold or ear resulting from the buckling or collapse. However, the use of a special tool is oftentimes undesirable or even impossible. It has now been discovered that the buckling or collapsing in the center of the ear or fold causing the sharp bending can be avoided by means of a reinforcement generally designated by reference numeral 40 in FIGURE 14. This reinforcement may be realized in the form of a recess or indentation 40′ (as illustrated in FIGURES 15, 16 and 17) or in the form of a bent-out indentation 40″ or 40‴ as illustrated in FIGURES 18 through 22. Thus, the reinforcement may be realized by means of a small groove, indentation, depression, notch or recess in the central part or web portion of the fold or ear which extends in the direction of the band, i.e., in the circumferential direction of the clamp. Stretching and stress work thereby occurs in the desired type of deformation. The rim portions of the fold or ear are then used to an increased extent in connection with the bending work. Experiments have indicated that the force in the circumferential direction necessary to open the contracted ear or fold has to be increased by more than 50%, at times to almost twice the force necessary heretofore, when the ear or fold was provided with a reinforcement according to the present invention. These startling, unexpected results permit the use of thinner band material which is important not only from an economic point of view but also from the point of view of deformability and elasticity of the resulting clamp.

While FIGURES 15, 16 and 18 through 22 illustrate the reinforcing means according to the present invention with approximately rectangularly shaped folds or ears and FIGURE 17 illustrates the same with a double-ear construction, it is to be understood that the reinforcing means in the form of bent-out or bent-in recesses, indentations, notches, or grooves according to the present invention may be used with any other type of fold or ear, as described herein or as known in the prior art. Additionally, instead of one also two or more reinforcing means may be used, disposed adjacent one another in the axial direction, with any respective ear depending on the nature of the material, the type of ear and dimensions thereof as well as the results to be achieved. However, regardless of the type of reinforcing means, it permits the use of thinner band material than utilizeable heretofore without the need of special tools. Additionally, the reinforcing means according to the present invention considerably increases the strength of the ear and thus the pressure withstandability of the clamp.

3,402,436

I claim:

1. A clamping element for the contraction of an annular element of substantially flat material such as a ring or band adapted for use with rubber and plastic tubing, comprising, in at least one place of said element, a unitary multi-hump bent-out portion of approximately undulatory shape for contracting the annular element and constituting only a small fraction of the length of the annular element in the circumferential direction thereof, each hump having two approximately radially outwardly extending portions with means connecting the same at the respective outer ends to provide a curved connection with a relatively larger radius of curvature in the contracted condition of the clamping element leaving each two approximately radially extending portions of a hump in non-parallel condition, the inner ends of each two outwardly extending portions of a hump passing over into the annular element with a relatively smaller radius of curvature which, however, is of such length that well-defined, rounded-off corners remain in the contracted condition, and two humps directly following one another in the circumferential direction and being close enough to one another to enable contraction by a common tool.

2. A clamping element according to claim 1 wherein said multi-hump, bent-out portion has the shape of a double ear upon contraction thereof with the curved connection between the inner ends of two mutually facing, outwardly extending portions of two successive humps projecting inwardly of the normal contour of the clamping element.

3. A clamping element according to claim 2, wherein adjacent walls of the double ear are in contact with each other.

4. A clamping element according to claim 1, wherein said multi-hump, bent-out portion has the shape of a crown ear upon contraction thereof with mutually opposite wall portions of two successive humps closely approaching the plane of the circumference of the clamping element while maintaining well-defined curvatures in their connections with adjoining portions of the clamping element.

5. A clamping element according to claim 1, wherein each multi-hump, bent-out portion includes three humps directly following one another in the circumferential direction.

6. A clamping element according to claim 1, wherein the annular element includes a band with perforation apertures, said unitary multi-hump bent-out portion including hook means near the ends thereof for engagement with the perforations of the band to connect together the band at its free ends into the annular element.

7. A clamping decise adapted for use with rubber and plastic tubular objects and the like, comprising an annularly shaped element of substantial flat material and provided at least in one place thereof with a unitary multi-hump pocket-like fold structure of approximately undulatory shape for contracting the annularly shaped element and constituting only a small fraction of the length of the annular element, said fold structure including a connecting portion between each two consecutive hump-like portions, and each hump-like fold structure having two generally outwardly extending portions with means connecting the same at the respective outer ends to provide a well-defined curved connection therebetween in the contracted condition of the clamping device with the outwardly extending portions of a respective hump-like fold structure being in non-parallel relationship, the inner ends of each two outwardly extending portions of a respective hump-like fold structure passing over into the annular element with a radius of curvature providing well-defined, rounded-off corners in the contracted condition, and two hump-like fold structures directly following one another in the circumferential direction and being close enough to each other to enable contraction by a common tool.

8. A clamping device according to claim 7, further comprising reinforcing means in the form of at least one substantially circumferentially extending reinforcing depression in at least one of the two parts consisting of said connecting portion and of said connecting means.

9. A clamping device according to claim 8, wherein said reinforcing means is provided only in said connecting portion.

10. A clamping device according to claim 8, wherein said reinforcing means is provided only in said connecting means.

11. A clamping device according to claim 8, wherein said reinforcing means is provided in both said connecting and connecting means.

12. A clamping device according to claim 8, wherein said depression extends in the radially inward direction.

13. A clamping device according to claim 8, wherein said connecting portion is of the same order of dimension in the circumferential direction as the opening formed underneath an uncontracted pocket-like fold structure.

14. A clamping device according to claim 7, wherein said connecting portion is of the same order of dimension in the circumferential direction as the opening formed underneath an uncontracted pocket-like fold structure.

15. In a clamp structure in which a band is clamped against the outer surface of another object by means of an approximately U-shaped ear means having outwardly extending leg portions interconnected at their outer ends by an approximately circumferential web portion, wherein the improvement essentially consists of reinforcing means in the form of at least one indentation in at least the center area of said web portion, said indentation extending substantially in the circumferential direction of the fold means to prevent bucking and collapsing of said fold means into a pointed configuration during contraction thereof by application of pressure at the places of transition from said band into said leg portions and to obtain well-defined curved surfaces within the areas of the inner as well as the outer ends of the leg portions.

16. The improvement according to claim 15, wherein the material of said ear means has a thickness of less than 1 mm.

17. The improvement according to claim 16 wherein said ear means is made of a material having a deformable structure from a metallurgical point of view.

18. The improvement according to claim 16, wherein the material of said ear means is highly elastic spring steel.

19. The improvement according to claim 15, wherein said ear means is integral with the band which forms only a portion of the circumference of the clamp structure and is provided with hook means for engaging into perforation apertures provided in the band of the remaining clamp circumference.

20. The improvement according to claim 15, wherein said ear means is a double ear.

21. The improvement according to claim 15, wherein said ear means includes three ears adjacent one another.

22. The improvement according to claim 15, wherein said ear means is of approximately rectangular shape.

23. The improvement according to claim 15, wherein said ear means is of approximately semi-circular shape.

24. The improvement according to claim 15, wherein said ear means is of approximately sinusoidal shape.

25. In a clamp structure, the improvement according to claim 15, wherein the indentation extends in the inward direction toward the center of the clamp structure.

26. A clamp for the contraction of a clamping band about tubular objects and the like, comprising at least one ear for contracting said clamping band, said ear including generally outwardly extending leg portions interconnected at their outer ends by an approximately circumferentially extending web portion and provided at their inner ends with well-defined curved transitional portions of given radius of curvature, and reinforcing means in the form of at least one indentation in the center area of said web portion and extending substantially in the circumferential direction of the clamp to realize well-defined curvatures in the connections between said web portion and the leg portions in the contracted condition of the ear and increase the clamping pressure realizable by the clamp.

27. A clamp according to claim 26, wherein said indentation is provided in said ear prior to contraction thereof.

References Cited

UNITED STATES PATENTS

| | | | |
|---|---|---|---|
| 282,466 | 7/1883 | Preston | 285—256 |
| 1,464,335 | 8/1923 | Petry | 24—22 |
| 2,614,304 | 10/1952 | Oetiker | 24—20 |
| 2,746,601 | 5/1956 | Rebichon | 24—23 X |
| 3,087,221 | 4/1963 | Armstron | 24—20 X |
| 3,106,757 | 10/1963 | Thurston et al. | 24—20 |
| 3,235,925 | 2/1966 | Gerhardt et al. | 24—23 |
| 1,031,188 | 7/1912 | Law | 24—20 |
| 1,242,027 | 10/1917 | Olmsted | 24—256 |
| 2,666,004 | 1/1954 | Gerrard | 24—256 X |
| 2,917,286 | 12/1959 | Deakin | 339—259 |

FOREIGN PATENTS

| | | |
|---|---|---|
| 1,169,301 | 9/1958 | France. |
| 1,090,821 | 10/1960 | Germany. |
| 1,348,317 | 11/1963 | France. |

DONALD A. GRIFFIN, *Primary Examiner.*